United States Patent
Higashihara

(10) Patent No.: US 10,173,568 B2
(45) Date of Patent: Jan. 8, 2019

(54) VEHICLE SEAT STRUCTURE

(71) Applicant: TOYOTA JIDOSHA KABUSHIKI KAISHA, Toyota-shi, Aichi-ken (JP)

(72) Inventor: Shota Higashihara, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/729,096

(22) Filed: Oct. 10, 2017

(65) Prior Publication Data

US 2018/0126887 A1  May 10, 2018

(30) Foreign Application Priority Data

Nov. 7, 2016 (JP) ................. 2016-217538

(51) Int. Cl.
| | |
|---|---|
| *B60N 2/50* | (2006.01) |
| *B60N 2/70* | (2006.01) |
| *B60N 2/72* | (2006.01) |

(52) U.S. Cl.
CPC .................. *B60N 2/7094* (2013.01)

(58) Field of Classification Search
CPC .................................. B60N 2/7094
USPC .......... 297/452.55, 452.46, 452.56
See application file for complete search history.

(56) References Cited

U.S. PATENT DOCUMENTS

| | | | | |
|---|---|---|---|---|
| 3,902,756 A * | 9/1975 | Chubb | ............ | A47C 7/02 297/452.56 |
| 4,583,783 A * | 4/1986 | Kanai | ............ | A47C 7/282 297/452.56 X |
| 4,603,907 A * | 8/1986 | Witzke | ............ | B60N 2/58 297/452.56 |
| 4,702,522 A * | 10/1987 | Vail | ............ | A47C 7/18 297/452.56 X |
| 4,723,816 A * | 2/1988 | Selbert | ............ | A47C 21/022 297/452.56 |
| 4,842,257 A * | 6/1989 | Abu-Isa | ............ | B60N 2/7011 297/452.56 X |
| 5,013,089 A * | 5/1991 | Abu-Isa | ............ | A47C 7/282 297/452.56 X |
| 5,015,034 A * | 5/1991 | Kindig | ............ | A47C 7/70 297/452.56 X |
| 5,439,271 A * | 8/1995 | Ryan | ............ | B60N 2/68 297/452.56 X |
| 6,082,824 A * | 7/2000 | Chow | ............ | A47C 7/022 297/452.56 X |
| 6,695,411 B2 * | 2/2004 | Leng | ............ | A47C 4/02 297/452.55 X |

(Continued)

FOREIGN PATENT DOCUMENTS

| | | |
|---|---|---|
| JP | 2006-061405 A | 3/2006 |
| JP | 2010-253242 A | 11/2010 |
| JP | 2015-020596 A | 2/2015 |

*Primary Examiner* — Rodney B White
(74) *Attorney, Agent, or Firm* — Oliff PLC

(57) ABSTRACT

A vehicle seat includes: a pair of cushion side frames disposed in a seat cushion, the cushion side frames being disposed with an interval in a seat-width direction; a cloth spring that is bridged between the cushion side frames, has a seating portion that receives a load of an occupant, and has elasticity; and a restriction cloth that is disposed below the cloth spring to face the cloth spring while being separated from the seating portion and has less tensile deformation than the cloth spring.

12 Claims, 6 Drawing Sheets

(56) References Cited

U.S. PATENT DOCUMENTS

| | | | | |
|---|---|---|---|---|
| 6,789,844 B1* | 9/2004 | Dennis | B60N 2/4242 | 297/452.56 X |
| 7,077,478 B2* | 7/2006 | Nakamura | B60N 2/68 | 297/452.56 X |
| 7,090,300 B2* | 8/2006 | Fujita | B60N 2/7058 | 297/452.56 X |
| 7,275,793 B2* | 10/2007 | Fujita | A47C 31/006 | 297/452.56 X |
| 7,481,493 B2* | 1/2009 | Fujita | A47C 7/28 | 297/452.56 X |
| 7,503,627 B2* | 3/2009 | Kawasaki | A47C 7/022 | 297/452.56 X |
| 7,618,096 B2* | 11/2009 | Fujita | B60N 2/7094 | 297/452.56 |
| 7,731,294 B2* | 6/2010 | Yasuda | B60N 2/58 | 297/452.56 X |
| 7,845,733 B2* | 12/2010 | Fujita | B60N 2/42709 | 297/452.56 X |
| 7,971,939 B2* | 7/2011 | Fujita | B60N 2/70 | 297/452.56 |
| 8,136,884 B2* | 3/2012 | Bullard | D04B 21/18 | 297/452.56 X |
| 8,506,016 B2* | 8/2013 | Mizobata | B60N 2/682 | 297/452.56 X |
| 8,727,445 B2* | 5/2014 | De Maina | B60N 2/686 | 297/452.56 X |
| 8,960,699 B2* | 2/2015 | Sprigle | A61G 5/10 | 297/452.56 X |
| 2002/0060493 A1* | 5/2002 | Nishino | B60N 2/58 | 297/452.56 |
| 2002/0096932 A1* | 7/2002 | Fujita | B60N 2/58 | 297/452.56 |
| 2003/0001424 A1* | 1/2003 | Mundell | A47C 7/16 | 297/452.56 |
| 2003/0006640 A1* | 1/2003 | Yasuda | A47C 1/02 | 297/452.35 |
| 2003/0193231 A1* | 10/2003 | Fujita | B60N 2/7094 | 297/452.56 |
| 2006/0055216 A1 | 3/2006 | Kawasaki | | |
| 2008/0106136 A1* | 5/2008 | Heidmann | A47C 7/28 | 297/452.56 |
| 2011/0298269 A1* | 12/2011 | Mizobata | B60N 2/682 | 297/452.18 |
| 2012/0299359 A1* | 11/2012 | Abe | B60N 2/70 | 297/452.56 |
| 2015/0265058 A1* | 9/2015 | Igarashi | A47C 7/445 | 297/285 |
| 2016/0029801 A1* | 2/2016 | Potrykus | A47C 31/023 | 297/285 |
| 2016/0100691 A1* | 4/2016 | Masunaga | A47C 7/462 | 297/285 |
| 2018/0093598 A1* | 4/2018 | Higashihara | B60N 2/68 | |

* cited by examiner

VEHICLE SEAT STRUCTURE

INCORPORATION BY REFERENCE

The disclosure of Japanese Patent Application No. 2016-217538 filed on 5 Nov. 7, 2016 including the specification, drawings and abstract is incorporated herein by reference in its entirety.

BACKGROUND

1. Technical Field

The disclosure relates to a vehicle seat structure.

2. Description of Related Art

Regarding a cushion member of a vehicle seat, a technique using a cloth spring as a cushion member has been developed. For example, Japanese Unexamined Patent Application Publication No. 2015-20596 (JP 2015-20596 A) discloses, for a seat cushion on which an occupant is seated, a vehicle seat structure having a pair of side frames, U-shaped pipe frames disposed between the side frames, and a cloth spring (net material) stretched between the pipe frames. By using the cloth spring having elasticity as the cushion member, a reduction in the weight of the cushion member can be achieved compared to a urethane pad, a metal spring, or the like.

SUMMARY

In the case of using the cloth spring having elasticity as described above, the cloth spring is bridged between the side frames, and a load of the seated occupant is received with the cloth spring that is elastically deformed.

Meanwhile, members constituting a seat such as a front rod are disposed below the cloth spring. In general, the distance between the cloth spring and a disposed object is set such that the cloth spring does not hit the object disposed below the cloth spring even when the cloth spring is elastically deformed under the load of the seated occupant. However, in a case where a load is concentrated on a range narrower than a normal range by the occupant having a posture of putting the occupant's knee on the seat cushion, or a load larger than a normal load is applied by a seating action with momentum, the displacement of the cloth spring increases, and the cloth spring and the disposed object may interfere with each other. When the deformation amount of the cloth spring is reduced simply by increasing the elastic modulus of the cloth spring, the seating comfort may be affected.

The disclosure provides a vehicle seat structure capable of maintaining the seating comfort while suppressing or preventing the interference between a cloth spring and a disposed object.

A first aspect of the disclosure relates to a vehicle seat structure including: a pair of cushion frames disposed in a seat cushion, the cushion frames being disposed with an interval in a seat-width direction or a seat front-rear direction; a cloth spring that is bridged between the cushion frames, has a seating portion that receives a load of an occupant, and has elasticity; and a restriction cloth that is disposed below the cloth spring to face the cloth spring while being separated from the seating portion and has less tensile deformation than the cloth spring.

According to the first aspect, the cloth spring that is bridged between the cushion frames and has elasticity is provided. The seating portion of the cloth spring receives the load of an occupant. The restriction cloth is disposed below the cloth spring. The restriction cloth faces the cloth spring while being separated from the seating portion. The restriction cloth has less tensile deformation than the cloth spring.

When the occupant is seated on the seat cushion, a load is applied to the cloth spring, the cloth spring is stretched between the cushion frames, and the seating portion of the cloth spring is elastically deformed downward. Since the seating portion of the cloth spring is separated from the restriction cloth, the cloth spring is elastically deformed without being affected by the restriction cloth until the cloth spring hits the restriction cloth. Therefore, the seating comfort is satisfactorily maintained.

On the other hand, when a load larger than a normal load is applied to the cloth spring, the cloth spring is elastically deformed downward and hits the restriction cloth. Since the restriction cloth has less tensile deformation than the cloth spring, the deformation of the cloth spring is suppressed. Accordingly, even when a load larger than a normal load is applied to the cloth spring or even when a load is concentrated on a range narrower than a normal range of the cloth spring, the interference between the cloth spring and the disposed object can be suppressed or prevented.

The restriction cloth includes a restriction cloth which has elasticity to the extent that visible deformation occurs under the load of the occupant (hereinafter, referred to as "a case having elasticity"), and a restriction cloth which has high elastic modulus to the extent that no visible deformation occurs under the load of the occupant (hereinafter, referred to as "a case of having no elasticity"). In the aspect of the disclosure, "having less tensile deformation than the cloth spring" means that the elastic modulus of the restriction cloth in the case where the restriction cloth has elasticity is higher than the elastic modulus of the cloth spring. In the case where the restriction cloth has no elasticity, the restriction cloth has less tensile deformation than the cloth spring having elasticity. In addition, the restriction cloth may be separated from the seating portion such that even when the restriction cloth comes into contact with a portion of the seating portion, the cloth spring can be elastically deformed at the initial stage of elastic deformation without being affected by the restriction cloth.

A second aspect of the disclosure relates to a vehicle seat structure including: a pair of back frames disposed in a seat back, the back frames being disposed with an interval between the back frames in a seat-width direction or a seat front-rear direction; a cloth spring that is bridged between the back frames, has a back support portion that receives a load of an occupant, and has elasticity; and a restriction cloth that is disposed behind the cloth spring to face the cloth spring while being separated from the back support portion and has less tensile deformation than the cloth spring.

According to the second aspect, the cloth spring that is bridged between the back frames and has elasticity is provided. The back support portion of the cloth spring receives the load of an occupant. The restriction cloth is disposed behind the cloth spring. The restriction cloth faces the cloth spring while being separated from the back support portion. The restriction cloth has less tensile deformation than the cloth spring.

When the occupant is seated and leans against the seat back, a load is applied to the cloth spring, the cloth spring is stretched between the back frames, and the back support portion of the cloth spring is elastically deformed rearward. Since the back support portion is separated from the restriction cloth, the cloth spring is elastically deformed without being affected by the restriction cloth until the cloth spring hits the restriction cloth. Therefore, the seating comfort is satisfactorily maintained.

On the other hand, when a load larger than a normal load is applied to the cloth spring, the cloth spring is elastically deformed rearward and hits the restriction cloth. Since the restriction cloth has less tensile deformation than the cloth spring, the deformation of the cloth spring is suppressed. Accordingly, even when a load larger than a normal load is applied to the cloth spring or even when a load is concentrated on a range narrower than a normal range of the cloth spring, the interference between the cloth spring and the disposed object can be suppressed or prevented.

In addition, the restriction cloth may be applied to both a case of having elasticity and a case of having no elasticity. In the aspect of the disclosure, "having less tensile deformation than the cloth spring" means that the elastic modulus of the restriction cloth in the case where the restriction cloth has elasticity is higher than the elastic modulus of the cloth spring. In the case where the restriction cloth has no elasticity, the restriction cloth has less tensile deformation than the cloth spring having elasticity. In addition, the restriction cloth may be separated from the back support portion such that even when the restriction cloth comes into contact with a portion of the back support portion, the cloth spring can be elastically deformed at the initial stage of elastic deformation without being affected by the restriction cloth.

According to the first and second aspects, while the seating comfort is maintained, the interference between the cloth spring and the disposed object can be suppressed or prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Hereinafter, an embodiment of a vehicle seat structure according to the aspects of the disclosure will be described with reference to FIGS. 1 to 6. Arrows FR, W, UP shown in the figures respectively indicate a forward direction in a seat front-rear direction, a seat-width direction, and an upward direction in a seat up-down direction.

Figure 1:
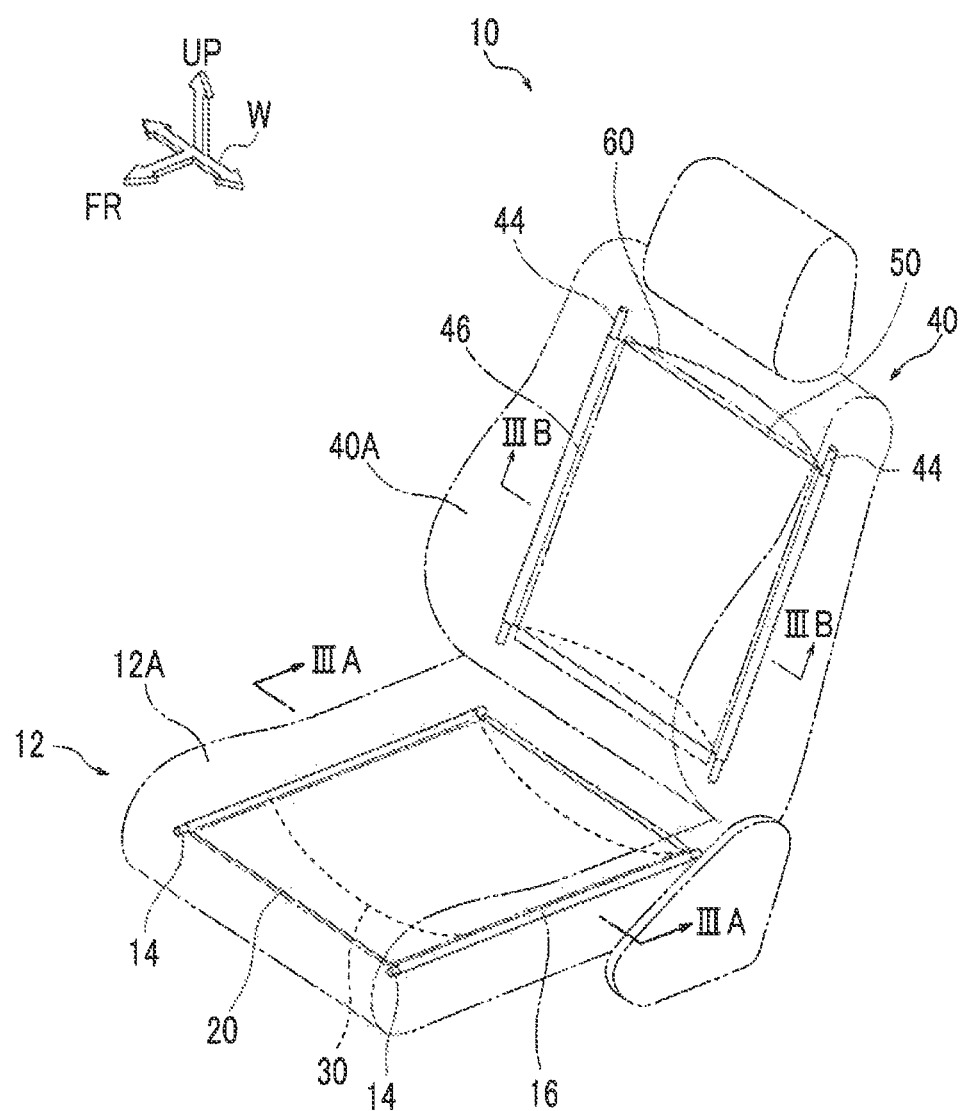
FIG. 1 is a perspective view illustrating a state in which a cloth spring is attached to a vehicle seat according to a first embodiment.

As illustrated in FIG. 1, a vehicle seat 10 of the embodiment includes a seat cushion 12 on which an occupant is seated, and a seat back 40 that stands upright on the rear end portion of the seat cushion 12 to support the upper part of the body of the occupant. The seat cushion 12 supports the occupant from the lower side. Cushion side portions 12A that protrude upward in the seat up-down direction are provided at both end portions of the seat cushion 12 in the seat-width direction. Back side portions 40A that protrude forward in the seat front-rear direction are provided at both end portions of the seat back 40 in the seat-width direction.

A pair of cushion side frames 14 is provided such that the cushion side frames 14 are respectively disposed in the cushion side portions 12A at both ends of the seat cushion 12 in the seat-width direction (vehicle-width direction). The cushion side frames 14 are disposed with an interval. The cushion side frames 14 extend along the front-rear direction of the vehicle seat 10 (seat front-rear direction). The cushion side frame 14 may be formed of a rod-shaped member, a wire, or the like.

Figure 2:
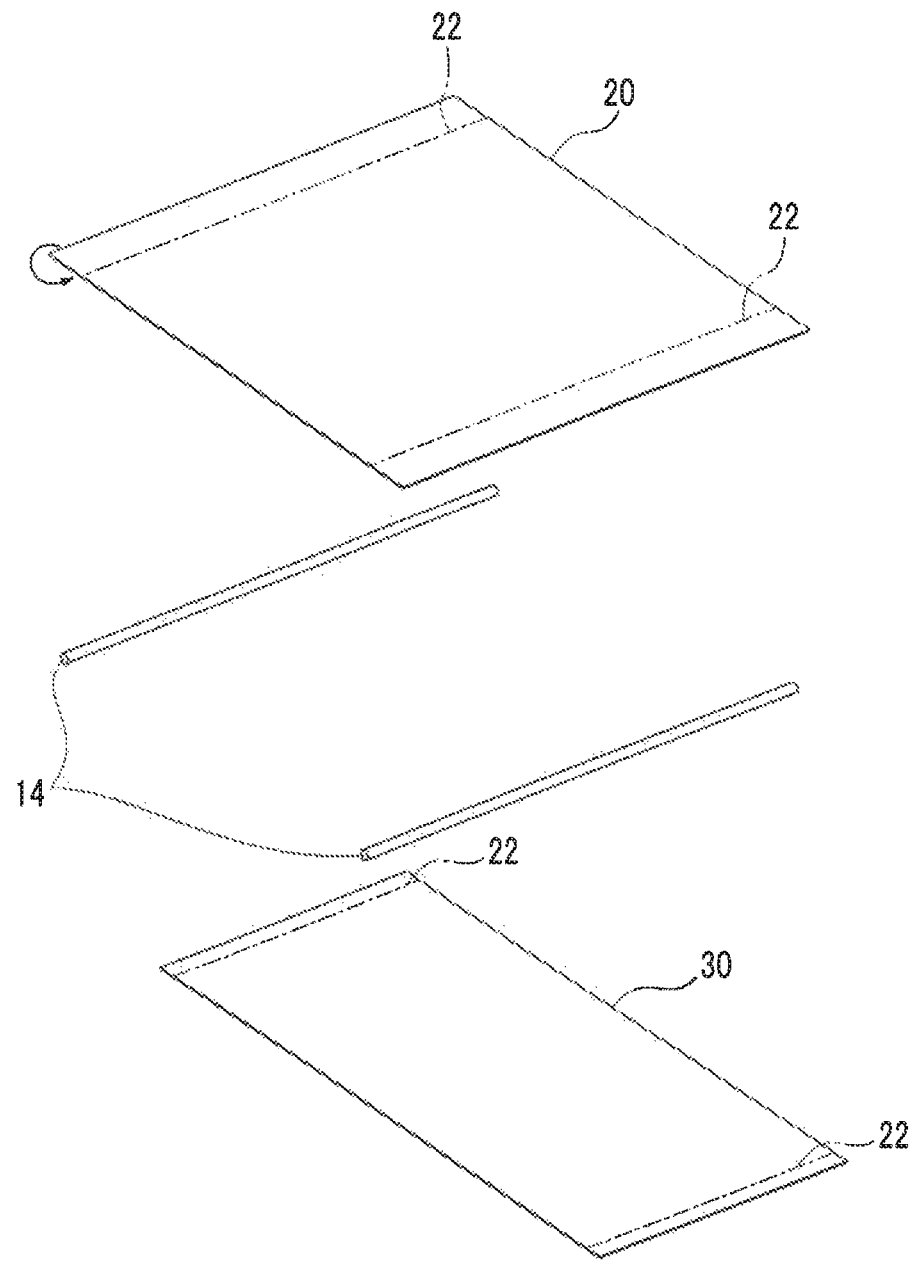
FIG. 2 is a perspective view of the cloth spring, cushion side frames, and a restriction cloth.
Figure 3A:
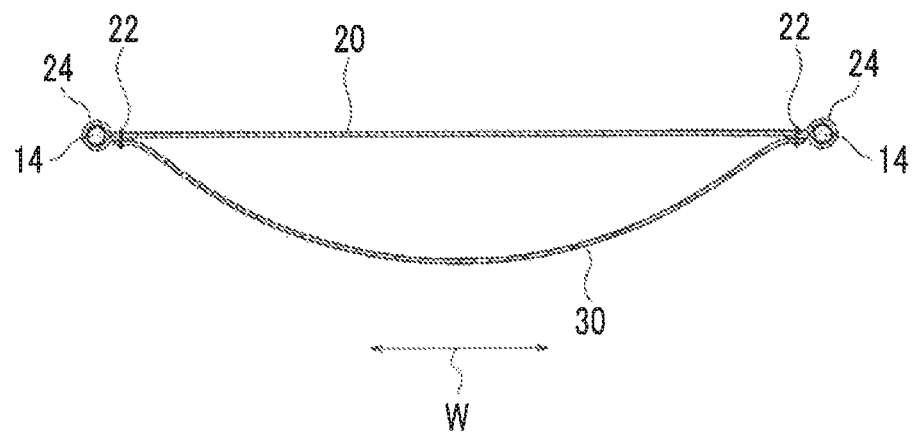
FIG. 3A is a cross-sectional view taken along line IIIA-IIIA in FIG. 1.
Figure 3B:
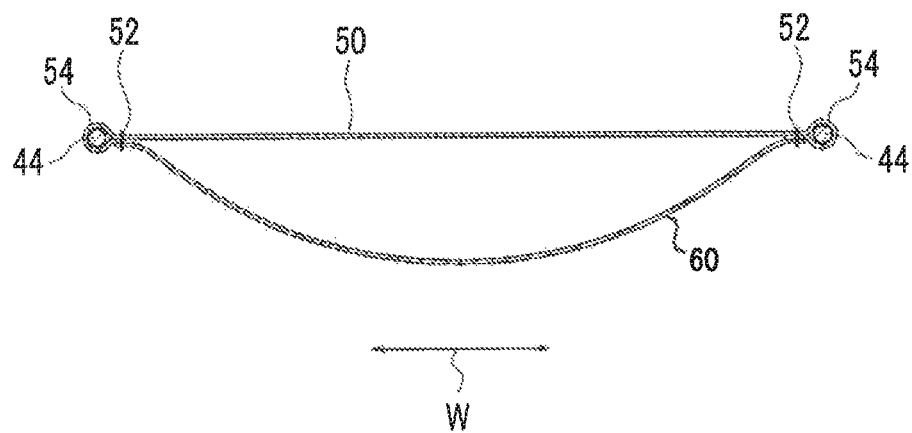
FIG. 3B is a cross-sectional view taken along line IIIB-IIIB in FIG. 1.

A cloth spring 20 is bridged between the cushion side frames 14 in the seat-width direction. The cloth spring 20 is formed of a cloth material having elasticity, such as elastic fabric, and as illustrated in FIG. 2, has a substantially rectangular shape in a plan view. As illustrated in FIG. 3A, both ends of the cloth spring 20 in the seat-width direction are folded back on the width end portions of the cloth spring 20, and the overlapping end portions are sewn together. Hereinafter, the sewn part is called a "sewn portion 22". Hollow annular portions 24 are formed closer to the end portions of the cloth spring 20 in the seat-width direction than the sewn portions 22. The cloth spring 20 is attached to the cushion side frames 14 by inserting the cushion side frames 14 into the annular portions 24. The cushion side frames 14 are attached to the frame members (not illustrated) of the seat cushion 12 that is slidably supported by the vehicle body.

In the cloth spring 20, a seating portion 16 is formed between the cushion side frames 14 in the seat-width direction. The seating portion 16 is a portion that is displaced downward under a load received when the occupant is seated on the vehicle seat 10.

A restriction cloth 30 is attached to the cushion side frames 14. The restriction cloth 30 has a substantially rectangular shape and is formed of a cloth material having elasticity, such as elastic fabric. In the embodiment, "having elasticity" means to have elasticity to the extent that visible deformation occurs under a load from the occupant. The elastic modulus of the restriction cloth 30 is set to be higher than the elastic modulus of the cloth spring 20. Therefore, the restriction cloth 30 has less tensile deformation under the load caused from the seated occupant compared to the cloth spring 20.

A first end and a second end of the restriction cloth 30 in the seat-width direction are sewn to the cloth spring 20 at the same positions as the positions of the sewn portions 22 of the cloth spring 20. Accordingly, both ends of the restriction cloth 30 in the seat-width direction are indirectly attached to the cushion side frames 14 such that the restriction cloth 30 is bridged between the cushion side frames 14. The length of the restriction cloth 30 in the seat-width direction is longer than the length of the cloth spring 20 in the seat-width direction, and the restriction cloth 30 is loosened such that the center of the restriction cloth 30 in the seat-width direction is positioned downward.

A pair of back side frames 44 is provided such that the back side frames 44 are respectively disposed in the back side portions 40A at both ends of the seat back 40 in the seat-width direction (vehicle-width direction). The back side frames 44 are disposed with an interval. The back side frames 44 extend along the up-down direction of the vehicle seat 10 (seat up-down direction). The back side frames 44 may be formed of a rod-shaped member, a wire, or the like.

A cloth spring 50 is bridged between the back side frames 44 in the seat-width direction. The cloth spring 50 has a similar configuration to that of the cloth spring 20, and has sewn portions 52 corresponding to the sewn portions 22 and annular portions 54 corresponding to the annular portions 24 (see FIG. 3B). The cloth spring 50 is attached to the back side frames 44 by inserting the back side frames 44 into the annular portions 54. The back side frames 44 are attached to the frame members (not illustrated) of the seat back 40.

In the cloth spring 50, a back support portion 46 is formed between the 5 back side frames 44 in the seat-width direction. The back support portion 46 is a portion that is displaced rearward under the load of the occupant when the occupant is seated on the vehicle seat 10 and leans against the seat back 40.

A restriction cloth 60 is attached to the back side frames 44. The restriction cloth 60 has a similar configuration to that of the restriction cloth 30, and the elastic modulus of the restriction cloth 60 is set to be higher than the elastic modulus of the cloth spring 50. Therefore, the restriction cloth 60 has less tensile deformation under the load caused from the seated occupant compared to the cloth spring 50.

A first end and a second end of the restriction cloth 60 in the seat-width direction are sewn to the cloth spring 50 at the same positions as the positions of the sewn portions 52 of the cloth spring 50. Accordingly, both ends of the restriction cloth 60 in the seat-width direction are indirectly attached to the back side frames 44 such that the restriction cloth 60 is bridged between the back side frames 44. The length of the restriction cloth 60 in the seat-width direction is longer than the length of the cloth spring 50 in the seat-width direction, and the restriction cloth 60 is loosened such that the center of the restriction cloth 60 in the seat-width direction is positioned rearward.

Next, the operations and effects of the embodiment will be described.

When the occupant is seated on the seat cushion 12, a load is applied to the cloth spring 20, and the seating portion 16 of the cloth spring 20 is elastically deformed downward. Since the seating portion 16 is separated from the restriction cloth 30, the 25 cloth spring 20 is elastically deformed without being affected by the restriction cloth 30 until the cloth spring 20 hits the restriction cloth 30. Therefore, the seating comfort is satisfactorily maintained.

In addition, when the occupant leans against the seat back 40, a load is applied to the cloth spring 50, and the back support portion 46 of the cloth spring 50 is elastically deformed rearward. Since the back support portion 46 is separated from the restriction cloth 60, the cloth spring 50 is elastically deformed without being affected by the restriction cloth 60 until the cloth spring 50 hits the restriction cloth 60. Therefore, the seating comfort is satisfactorily maintained.

Figure 4A:
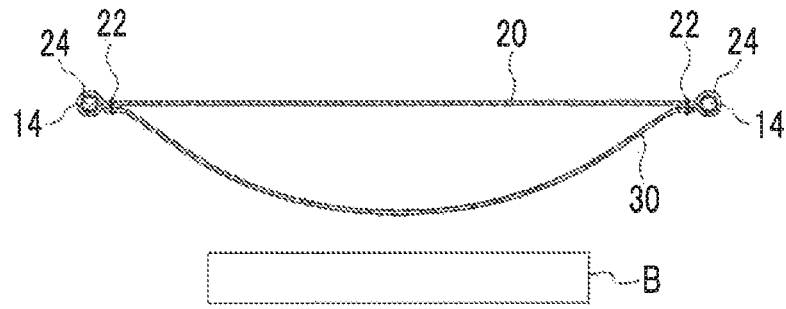
FIG. 4A is a view illustrating a case where an occupant puts the occupant's knee on the vehicle seat according to the first embodiment.
Figure 4B:
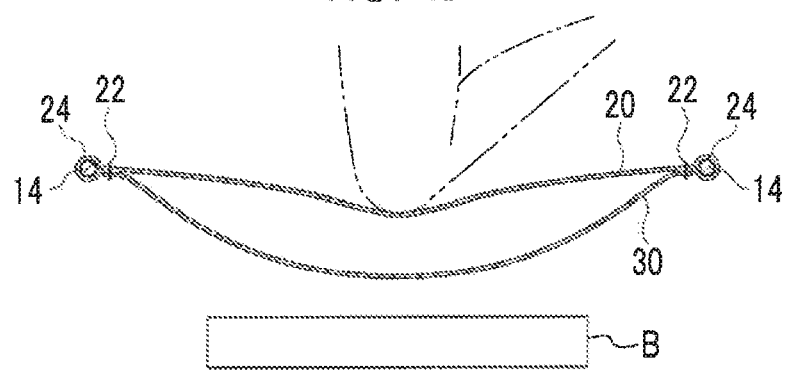
FIG. 4B is a view illustrating the case where the occupant puts the occupant's knee on the vehicle seat according to the first embodiment.
Figure 4C:
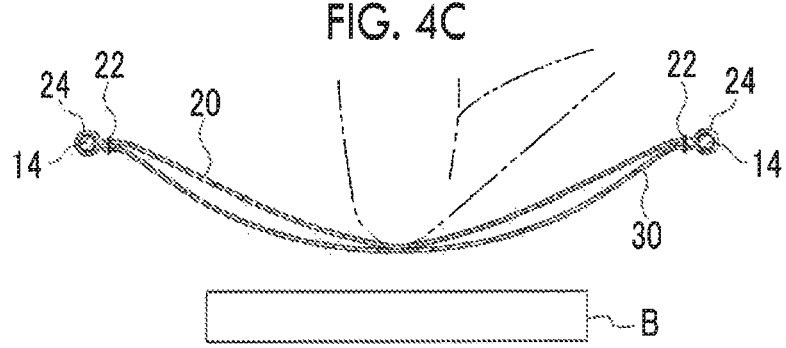
FIG. 4C is a view illustrating the case where the occupant puts the occupant's knee on the vehicle seat according to the first embodiment.
Figure 4D:
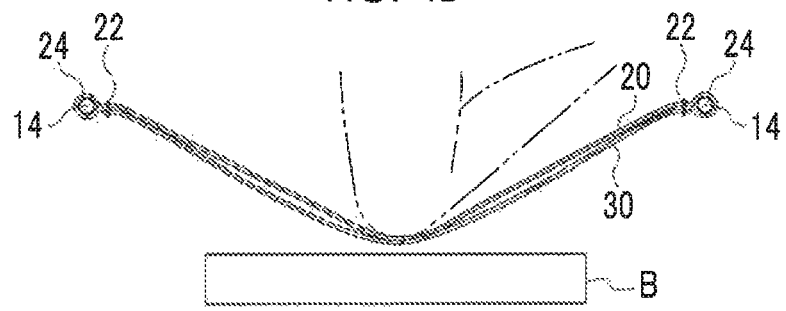
FIG. 4D is a view illustrating the case where the occupant puts the occupant's knee on the vehicle seat according to the first embodiment.
Figure 5:
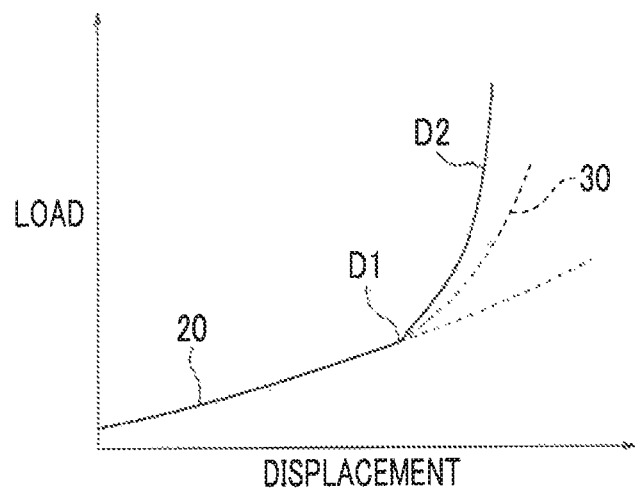
FIG. 5 is a graph showing the relationship between the load applied to the cloth spring according to the first embodiment and the displacement of the cloth spring.

On the other hand, when a load locally larger than a normal load is applied to the cloth spring 20, for example, by the occupant putting the occupant's knee on the seat cushion 12, a portion to which the load is applied is elastically deformed downward as illustrated in FIG. 4B from the state illustrated in FIG. 4A. FIG. 5 shows the relationship between the load applied to the cloth spring 20 and the displacement of the cloth spring 20. The cloth spring 20 is displaced by the characteristics of the cloth spring 20 until the cloth spring 20 hits the restriction cloth 30. When the elastic deformation further progresses, the cloth spring 20 hits the restriction cloth 30 as illustrated in FIG. 4C. In addition, as illustrated in FIG. 4D, the cloth spring 20 is elastically deformed downward together with the restriction cloth 30. At this time, the cloth spring 20 and the restriction cloth 30 are joined, and both the sides are displaced by the joined characteristics as indicated by the solid line on the right side from the dot D1 in FIG. 5, and thus are less likely to be elastically deformed downward. In addition, on the right side from the dot D2, even when the load increases, the cloth spring 20 and the restriction cloth 30 are rarely displaced. When a distance corresponding to the displacement amount of the dot D2 is secured between the cloth spring 20 and a disposed object B before displacement, the cloth spring 20 can be restricted to the displacement to a position at which the cloth spring 20 does not reach the disposed object B.

As described above, a predetermined amount or more of the deformation of the cloth spring 20 is suppressed. Therefore, even when a load larger than a normal load is applied to the cloth spring 20 of the seat cushion 12 or even when a load is concentrated on a range narrower than a normal range of the cloth spring 20, the interference between the cloth spring 20 and the disposed object B can be suppressed or prevented.

Even when a load larger than a normal load is applied to the cloth spring 50 of the seat back 40 or even when a load is concentrated on a range narrower than a normal range of the cloth spring 50, similarly, the interference between the cloth spring 50 and a disposed object can be suppressed or prevented.

Figure 6:
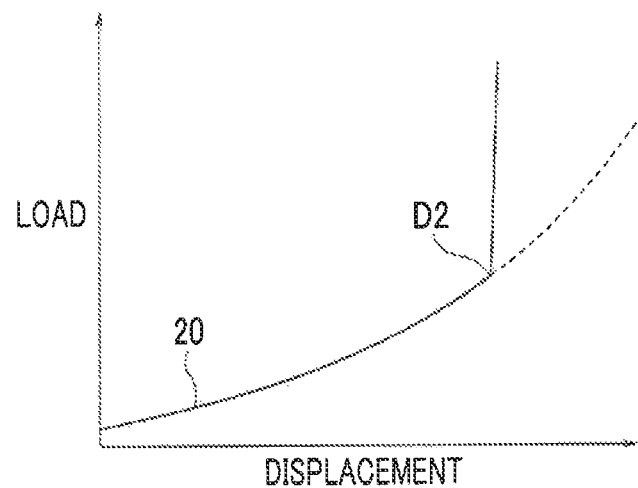
FIG. 6 is a graph showing the relationship between the load applied to a cloth spring according to a modification example of the first embodiment and the displacement of the cloth spring.

In the embodiment, the restriction cloths 30, 60 are formed as a cloth member having elasticity. However, the restriction cloths 30, 60 may also be formed of a cloth member having no elasticity. In addition, "in a case of having no elasticity" means a case where the elastic modulus is high to the extent that no visible deformation occurs under the load from the occupant. In this case, as illustrated in FIG. 6, even when the cloth spring 20 hits the restriction cloth 30 and a tensile force is exerted on the restriction cloth 30, the restriction cloth 30 is not elastically deformed, and the cloth spring 20 is restricted so as not to be displaced. Accordingly, the interference between the cloth spring 20 and the disposed object can be suppressed or prevented.

Second Embodiment

Next, a vehicle seat structure according to a second embodiment of the disclosure will be described. In the embodiment, like elements similar to those of the first embodiment are denoted by like reference numerals, and detailed descriptions thereof will be omitted.

Figure 7:
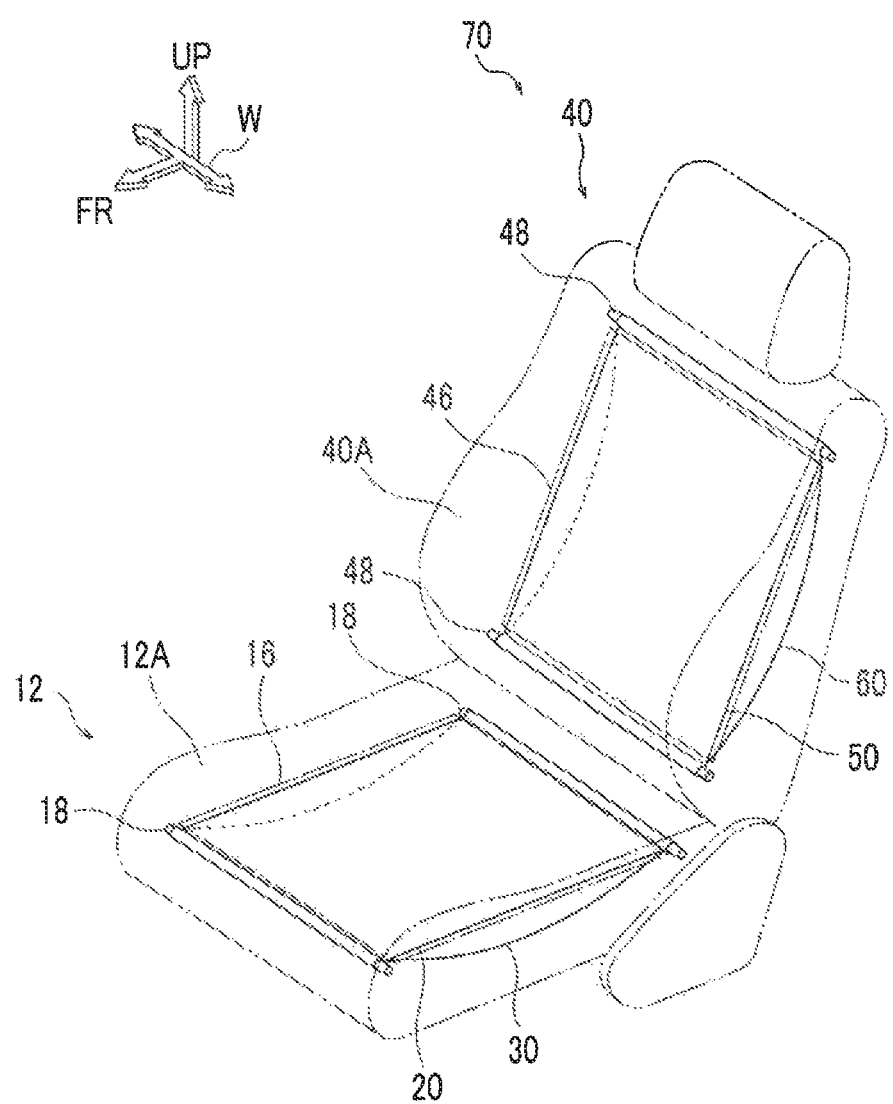
FIG. 7 is a perspective view illustrating a state in which the cloth spring is attached to a vehicle seat according to a second embodiment.

As illustrated in FIG. 7, a vehicle seat 70 of the embodiment is different from the vehicle seat 10 of the first embodiment in the direction in which the cloth spring and the restriction cloth are bridged. In the embodiment, the cloth spring 20 and the restriction cloth 30 are bridged in the front-rear direction, and the cloth spring 50 and the restriction cloth 60 are bridged in the up-down direction.

A pair of cushion front-rear frames 18 is provided such that the cushion front-rear frames 18 are disposed at both ends of the seat cushion 12 in the seat front-rear direction (vehicle front-rear direction). The cushion front-rear frames 18 are disposed with an interval. The cushion front-rear frames 18 extend along the width direction of the vehicle seat 70 (seat-width direction). The cushion front-rear frame 18 may be formed of a rod-shaped member, a wire, or the like. As in the first embodiment, the cloth spring 20 and the restriction cloth 30 are attached to the cushion front-rear frames 18. In the cloth spring 20, the seating portion 16 is formed between the cushion front-rear frames 18 in the seat front-rear direction. The cushion front-rear frames 18 are attached to the frame members (not illustrated) of the seat cushion 12.

A pair of back up-down frames 48 is disposed such that the back up-down frames 48 are disposed at both ends of the seat back 40 in the seat up-down direction (vehicle up-down direction). The back up-down frames 48 are disposed with an interval. The back up-down frames 48 extend along the width direction (seat-width direction) of the vehicle seat 70. The back up-down frame 48 may be formed of a rod-shaped member, a wire, or the like. As in the first embodiment, the cloth spring 50 and the restriction cloth 60 are attached to the back up-down frames 48. In the cloth spring 50, the back support portion 46 is formed between the back up-down frames 48 in the seat up-down direction. The back up-down frames 48 are attached to the frame members (not illustrated) of the seat back 40.

Since the vehicle seat 70 of the embodiment is also provided with the restriction cloths 30, 60, similar operations and effects to those of the first embodiment can be obtained.

Furthermore, in the second embodiment, since the cloth spring 20 is bridged in the front-rear direction of the vehicle seat 10, the waist of the seated occupant is supported so as to be restrained in the front-rear direction, and thus the rotation of the waist in the front-rear direction is suppressed.

On the other hand, in the first embodiment, since the cloth spring 20 is bridged in the vehicle-width direction of the vehicle seat 10, the waist of the seated occupant is supported so as to be restrained in the right-left direction, and thus the rotation of the waist in the right-left direction is suppressed.

In the second embodiment, the restriction cloths 30, 60 may also be formed of a cloth member having no elasticity.

In the vehicle seat structure according to the embodiments, the restriction cloth may be bridged between the same members as the members between which the cloth spring is bridged.

With the vehicle seat structure according to the embodiments, since the restriction cloth is bridged between the members between which the cloth spring is bridged, members between which the restriction cloth is bridged are not additionally needed, and an increase in the number of components can be suppressed.

In the vehicle seat structure according to the embodiments, the restriction cloth may have a higher elastic modulus than the cloth spring.

With the vehicle seat structure according to the embodiments, since the restriction cloth has elasticity, an impact applied when the cloth spring comes into contact with the restriction cloth can be reduced.

While the embodiments of the disclosure have been described above, the disclosure is not limited to the above description, and it is natural that various modifications other than the embodiments can be made within a scope without departing from the disclosure.

What is claimed is:

1. A vehicle seat structure comprising: a pair of cushion frames disposed in a seat cushion, the cushion frames being disposed with an interval in a seat-width direction; a cloth spring that is bridged between the cushion frames, the cloth spring having a seating portion that receives a load of an occupant, and the cloth spring having elasticity; and a restriction cloth that is disposed below the cloth spring to face the cloth spring while being separated from the seating portion and has less tensile deformation than the cloth spring, the cloth spring and the restrictive cloth both being fastened to the cushion frames.

2. The vehicle seat structure according to claim 1, wherein the restriction cloth is bridged between the same cushion frames as the cushion frames between which the cloth spring is bridged.

3. The vehicle seat structure according to claim 1, wherein: the cushion frames are a pair of cushion side frames, the cushion side frames being disposed with an interval in the seat-width direction; and the seating portion is formed in the cloth spring between the cushion side frames in the seat-width direction.

4. The vehicle seat structure according to claim 1, wherein: the cushion frames are a pair of cushion front-rear frames, the cushion front-rear frames being disposed with an interval in the seat front-rear direction; and the seating portion is in the cloth spring between the cushion front-rear frames in the seat front-rear direction.

5. The vehicle seat structure according to claim 1, wherein the restriction cloth has a higher elastic modulus than an elastic modulus of the cloth spring.

6. The vehicle seat structure according to claim 1, wherein a length of the restriction cloth in the seat-width direction is longer than a length of the cloth spring in the seat-width direction.

7. A vehicle seat structure comprising: a pair of back frames disposed in a seat back, the back frames being disposed with an interval in a seat-width direction or a seat up-down direction; a cloth spring that is bridged between the hack frames, the cloth spring having a back support portion that receives a load of an occupant, and the cloth spring having elasticity; and a restriction cloth that is disposed behind the cloth spring to face the cloth spring while being separated from the hack support portion and has less tensile deformation than the cloth spring.

8. The vehicle seat structure according to claim 7, wherein the restriction cloth is bridged between the same back frames as the hack frames between which the cloth spring is bridged.

9. The vehicle seat structure according to claim 7, wherein: the back frames are a pair of hack side frames, the back side frames being disposed with an interval in the seat-width direction; and the back support portion is formed in the cloth spring between the back side frames in the seat-width direction.

10. The vehicle seat structure according to claim 7, wherein: the back frames are a pair of back up-down frames, the back up-down frames being disposed with an interval in the seat up-down direction; and the back support portion is formed in the cloth spring between the back up-clown frames in the seat up-down direction.

11. The vehicle seat structure according to claim 7, wherein the restriction cloth has a higher elastic modulus than an elastic modulus of the cloth spring.

12. The vehicle seat structure according to claim 7, wherein a length of the restriction cloth in the seat-width direction is longer than a length of the cloth spring in the seat-width direction.

* * * * *